United States Patent
Al Hamouz et al.

(10) Patent No.: US 11,897,789 B2
(45) Date of Patent: Feb. 13, 2024

(54) POLYMER/CARBON NANOTUBE COMPOSITE AND METHODS FOR WASTEWATER TREATMENT

(71) Applicant: KING FAHD UNIVERSITY OF PETROLEUM AND MINERALS, Dhahran (SA)

(72) Inventors: Othman Charles Sadeq Al Hamouz, Dhahran (SA); Isaiah Olabisi Adelabu, Dhahran (SA); Tawfik Abdo Saleh Awadh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 395 days.

(21) Appl. No.: 15/887,792

(22) Filed: Feb. 2, 2018

(65) Prior Publication Data

US 2019/0240642 A1     Aug. 8, 2019

(51) Int. Cl.

| | |
|---|---|
| *C02F 1/28* | (2023.01) |
| *B01J 20/26* | (2006.01) |
| *B01J 20/28* | (2006.01) |
| *B01J 20/30* | (2006.01) |
| *C08G 12/34* | (2006.01) |
| *C08K 3/04* | (2006.01) |
| *B82Y 30/00* | (2011.01) |
| *B82Y 40/00* | (2011.01) |
| *C02F 101/20* | (2006.01) |

(52) U.S. Cl.
CPC .............. *C02F 1/288* (2013.01); *B01J 20/265* (2013.01); *B01J 20/28059* (2013.01); *B01J 20/3085* (2013.01); *C08G 12/34* (2013.01); *C08K 3/041* (2017.05); *B82Y 30/00* (2013.01); *B82Y 40/00* (2013.01); *C02F 1/283* (2013.01); *C02F 1/285* (2013.01); *C02F 2101/20* (2013.01); *C08G 2340/00* (2013.01); *Y10S 977/746* (2013.01); *Y10S 977/75* (2013.01); *Y10S 977/752* (2013.01); *Y10S 977/847* (2013.01); *Y10S 977/903* (2013.01)

(58) Field of Classification Search
CPC .................. B01J 20/265; B01J 20/3085; B01J 20/28059; C02F 1/281; C02F 1/283; C02F 1/285; C02F 1/288; C02F 2101/20; C02F 2101/22; C02F 2101/103; C02F 2305/08; C02F 2303/16; C08K 3/041; C08G 12/34; C08G 2340/00; Y10S 977/903; Y10S 977/847; Y10S 977/75; Y10S 977/752; Y10S 977/746; B82Y 30/00; B82Y 40/00; C08L 61/30
See application file for complete search history.

(56) References Cited

U.S. PATENT DOCUMENTS

| | | | |
|---|---|---|---|
| 5,563,285 | A | 10/1996 | Blount |
| 5,693,725 | A | 12/1997 | Irving |

FOREIGN PATENT DOCUMENTS

| | | |
|---|---|---|
| CN | 105504344 A | 4/2016 |
| CN | 106256882 A | 12/2016 |
| RU | 2014117380 A | 12/2015 |
| WO | WO 2014/166347 A1 | 10/2014 |

OTHER PUBLICATIONS

Hamouz et al., Journal of Environmental Management, vol. 192, pp. 163-170 (2017).*
Adelabu, "Synthesis of New Cross-Linked Melamine Based Polyamines Impregnated Carbon Nanotube Composites for Toxic Metal Ion Removal", Master's Thesis, King Fahd University of Petroleum & Minerals, Dhahran, Saudi Arabia (May 2016).*
Al Hamouz , et al. "Novel cross-linked melamine based polyamine/CNT composites for lead ions removal", Journal of Environmental Management, vol. 192, Issue 1, Feb. 2, 2017, (Abstract Only).
Al Hamouz , et al. "Lead ion removal by novel highly cross-linked Mannich based polymers", Journal of the Taiwan Institute of Chemical Engineers, vol. 70, January Issue, Oct. 28, 2016, (Abstract Only).
Albakri , et al. "New series of benzene-1,3,5-triamine based cross-linked polyamines and polyamine/CNT composites for lead ion removal from aqueous solutions", Chemical Engineering Journal, vol. 333, Sep. 24, 2017, (Abstract Only).

\* cited by examiner

*Primary Examiner* — John Kim
(74) *Attorney, Agent, or Firm* — Oblon, McClelland, Maier & Neustadt, L.L.P.

(57) ABSTRACT

Polymer/carbon nanotube composites made up of melamine, aldehyde, diaminoalkane monomeric units and carbon nanotubes having activated carbonyl groups. A method for removing heavy metals, such as Pb(II) from an aqueous solution or an industrial wastewater sample with these composites is introduced. A process of synthesizing the polymer/carbon nanotube composites is also described.

20 Claims, 9 Drawing Sheets

POLYMER/CARBON NANOTUBE COMPOSITE AND METHODS FOR WASTEWATER TREATMENT

STATEMENT OF FUNDING ACKNOWLEDGEMENT

This project was funded by King Abdulaziz City for Science and Technology under project number AT-35-131 and King Fand University of Petroleum and Minerals.

STATEMENT REGARDING PRIOR DISCLOSURE BY THE INVENTORS

Aspects of this technology are described in an article "Novel cross-linked melamine based polyamine/CNT composites for lead ions removal" published in Journal of Environmental Management, 2017, 192, 163-170, on Feb. 2, 2017, which is incorporated herein by reference in its entirety.

BACKGROUND OF THE INVENTION

Technical Field

The present disclosure relates to a composite formed from a polycondensation reaction of melamine, an aldehyde, a diaminoalkane and carbon nanotubes. Additionally, the present disclosure relates to applications of the composite as adsorbing materials for the removal of heavy metals, such as lead(II) from aqueous solutions.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water resources contaminated with heavy metals have been a serious threat to human health, industries, and ecosystems ((WHO), 2011. World Health Organization, Guidelines for drinking water quality, 4th ed; and V. K Gupta, I. A., T. A. Saleh, A. Nayak, S. Agarwal, 2012. Chemical treatment technologies for wastewater recycling—an overview, RSC Advances 2, 6380-6388). Heavy metals such as mercury, arsenic, lead, cadmium, chromium etc. are characterized by their relatively high density and atomic weight, which explains their significant toxicity even at trace amounts. Among these heavy metals, lead(II) ions ($Pb^{2+}$) are of particular importance because of their high prevalence in water bodies. Moreover, lead(II) ions have been directly associated with the disruption of proper function of kidney, bones, intestines, liver, nervous and reproductive systems (Flora, S. J. S., Flora, G., Saxena, G., 2006. Chapter 4—Environmental occurrence, health effects and management of lead poisoning A2—Casas, José S, in: Sordo, J. (Ed.), Lead. Elsevier Science B. V., Amsterdam, pp. 158-228; and Jaishankar, M., Tseten, T., Anbalagan, N., Mathew, B. B., Beeregowda, K. N., 2014. Toxicity, mechanism and health effects of some heavy metals, Interdisciplinary Toxicology 7, 60-72). The adverse effect of lead(II) ions also impact ecosystems. Most water plants are expected to improve treatment technologies and provide optimum quality water at low cost, while posing little or no environmental side effects (H. Y. Yang, Z. J. H., S. F. Yu, K. L. Pey, K. Ostrikov, R. Karnik, 2013. Carbon nanotubes for water desalination and purification. Nat. Commun 4, 2220; and Ludwig, R., 2002. Extraction of metals from soils and waters, edited by D. Max Roundhill, Angew. Chem. Int. Ed. 41, 2611-2613, each incorporated herein by reference in their entirety).

Current water treatment technologies usually involve processes such as filtration, ion exchange mechanisms, coagulation, reverse osmosis, solvent extraction (Qifeng, W., Xiulian, R., jingjing, G., Yongxing, C., 2016. Recovery and separation of sulfuric acid and iron from dilute acidic sulfate effluent and waste sulfuric acid by solvent extraction and stripping. Journal of Hazardous Materials 304, 1-9, incorporated herein by reference in its entirety), flotation, sedimentation (Tarpagkou, R., Pantokratoras, A., 2014. The influence of lamellar settler in sedimentation tanks for potable water treatment—A computational fluid dynamic study. Powder Technology 268, 139-149, incorporated herein by reference in its entirety), disinfection and adsorption (Agrawal, A., Sahu, K. K., 2006. Separation and recovery of lead from a mixture of some heavy metals using Amberlite IRC 718 chelating resin, Journal of Hazardous Materials, 133, 299-303; Polat, H., Erdogan, D., 2007. Heavy metal removal from waste waters by ion flotation, Journal of Hazardous Materials, 148, 267-273; Toth, G., Hermann, T., Da Silva, M. R., Montanarella, L., 2016. Heavy metals in agricultural soils of the European Union with implications for food safety, Environment International, 88, 299-309; and Wang, S., Wang, K., Dai, C., Shi, H., Li, J., 2015. Adsorption of $Pb^{2+}$ on amino-functionalized core-shell magnetic mesoporous SBA-15 silica composite, Chemical Engineering Journal, 262, 897-903, each incorporated herein by reference in their entirety). Among these treatment technologies, adsorption is considered one of the best techniques due to its effectiveness, easy implementation, reusability, eco-friendly nature, and low cost (Girgis, B. S., El-Sherif, I. Y., Attia, A. A., Fathy, N. A., 2012. Textural and adsorption characteristics of carbon xerogel adsorbents for removal of Cu (II) ions from aqueous solution, Journal of Non-Crystalline Solids, 358, 741-747; and Mostafa, M. S., Bakr, A. S. A., El Naggar, A. M. A., Sultan, E. S. A., 2016. Water decontamination via the removal of Pb(II) using a new generation of highly energetic surface nano-material: $Co^{+2}Mo^{+6}$ LDH, Journal of Colloid and Interface Science, 461, 261-272, each incorporated herein by reference in their entirety).

Many polymers with adsorption potentials have been fabricated for the removal of heavy metals from contaminated aqueous media. However, these polymers suffer from one or more drawbacks that limit their practicality, such as low thermal stability, short life span, limited mechanical properties and extensive preparation requirements.

In view of the forgoing, it will be advantageous to develop adsorption materials that can effectively treat heavy metal contaminated water. One objective of the present disclosure is to provide a polymer/carbon nanotube composite formed from a polycondensation reaction of melamine, aldehyde, diaminoalkane and carbon nanotubes having activated carbonyl groups. The present disclosure further discloses a method for removing heavy metals, such as Pb(II) from an aqueous solution by utilizing the adsorbing capabilities of the composite described herein.

BRIEF SUMMARY OF THE INVENTION

According to a first aspect, the present disclosure relates to a composite, which is a polycondensation product formed by a reaction of (i) melamine, (ii) an aldehyde of formula (I)

(I)

or a salt, solvate, or stereoisomer thereof, (iii) a diaminoalkane of formula (II)

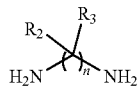

(II)

or a salt, solvate, tautomer or stereoisomer thereof, and (iv) carbon nanotubes comprising activated carbonyl groups, wherein (i) $R_1$ is selected from the group consisting of a hydrogen, an optionally substituted alkyl, an optionally substituted cycloalkyl, and an optionally substituted aryl, (ii) $R_2$ is selected from the group consisting of a hydrogen, an optionally substituted alkyl, an optionally substituted cycloalkyl, an optionally substituted aryl, and an optionally substituted arylalkyl, (iii) $R_3$ is selected from the group consisting of a hydrogen, an optionally substituted alkyl, an optionally substituted cycloalkyl, an optionally substituted aryl, and an optionally substituted arylalkyl, (iv) n is a positive integer in the range of 2-12, and (v) a weight percentage of the carbon nanotubes relative to a total weight of the composite is 0.005 wt % to 0.5 wt %.

In one embodiment, a molar ratio of the diaminoalkane of formula (II) to melamine is in the range of 1:1 to 5:1, and a molar ratio of the aldehyde of formula (I) to melamine is in the range of 2:1 to 10:1.

In one embodiment, the activated carbonyl group is an acyl halide group.

In one embodiment, the carbon nanotubes are at least one selected from the group consisting of multi-walled carbon nanotubes and single-walled carbon nanotubes.

In one embodiment, each $R_1$, $R_2$, and $R_3$ are a hydrogen, n is a positive integer in the range of 4-8, and the weight percentage of the carbon nanotubes relative to the total weight of the composite is 0.0075 wt % to 0.2 wt %.

In one embodiment, each $R_1$, $R_2$, and $R_3$ are a hydrogen, n is 6, and the weight percentage of the carbon nanotubes relative to the total weight of the composite is about 0.1 wt % to 0.2 wt %.

In one embodiment, the composite exhibits a semi-crystalline structure.

In one embodiment, the composite has a BET surface area in the range of 4-50 m²/g.

According to a second aspect, the present disclosure relates to a method of preparing the composite wherein the activated carbonyl group is an acyl halide group, comprising (i) reacting carboxylated carbon nanotubes with a thionyl halide to form carbon nanotubes having acyl halide groups, and (ii) reacting the carbon nanotubes having acyl halide groups with a diaminoalkane of formula (II)

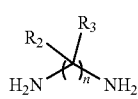

(II)

or a salt, solvate, tautomer or stereoisomer thereof in the presence of an aldehyde of formula (I)

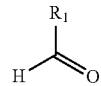

(I)

or a salt, solvate, or stereoisomer thereof, and melamine to form the composite.

In one embodiment, a molar ratio of the diaminoalkane of formula (II) to melamine is in the range of 1:1 to 5:1, and a molar ratio of the aldehyde of formula (I) to melamine is in the range of 2:1 to 10:1.

According to a third aspect, the present disclosure relates to a method for removing a heavy metal from an aqueous solution, comprising (i) contacting the aqueous solution having an initial concentration of the heavy metal with the composite to form a mixture, and (ii) filtering the mixture to obtain an aqueous solution having a reduced concentration of the heavy metal compared to the initial concentration.

In one embodiment, the heavy metal is an ion of at least one heavy metal selected from the group consisting of Pb, Cd, As, Zn, Cu, Ni, Co, Mn, and Cr.

In one embodiment, the heavy metal is Pb(II).

In one embodiment, the aqueous solution has a pH in the range of 1 to 7.

In one embodiment, the initial concentration of the heavy metal in the aqueous solution ranges from 0.1 mg $L^{-1}$ to 100 mg $L^{-1}$.

In one embodiment, the composite is present at a concentration in the range of 0.1-10 g per liter of the aqueous solution during the contacting.

In one embodiment, the composite is contacted with the aqueous solution for 0.1-12 hours.

In one embodiment, the composite is contacted with the aqueous solution at a temperature in the range of 15° C. to 80° C.

In one embodiment, greater than 25% of a total mass of the heavy metal is removed from the aqueous solution.

In one embodiment, each $R_1$, $R_2$, and $R_3$ are a hydrogen, n is 6, and the weight percentage of the carbon nanotubes relative to the total weight of the composite is about 0.1 wt % to 0.2 wt %, the aqueous solution comprises Pb(II) and at least one additional heavy metal ion, which is an ion of at least one heavy metal selected from the group consisting of Cd, As, Zn, Cu, Ni, Co, Mn, and Cr, and greater than 95% of a total mass of Pb(II) is removed from the aqueous solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Structures (1) and (2) represent a carboxylated carbon nanotube and a carbon nanotube having an acyl halide group, respectively, and "a" denotes the number of repeating units in the melamine-based polyamine.

Figure 2:
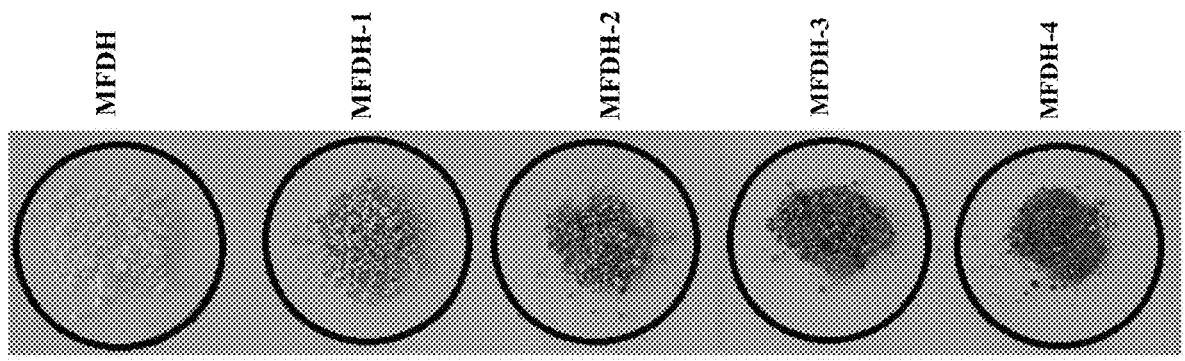

FIG. 2 illustrates the effect of weight percentage of carbon nanotubes on the color of the composite wherein each $R_1$, $R_2$, and $R_3$ are a hydrogen, n is 6, and the weight percentage of the carbon nanotubes relative to the total weight of the composite is 0 (MFDH), about 0.01% (MFDH-1), about 0.02 (MFDH-2), about 0.05 (MFDH-3), and about 0.1% (MFDH-4).

Figure 3:
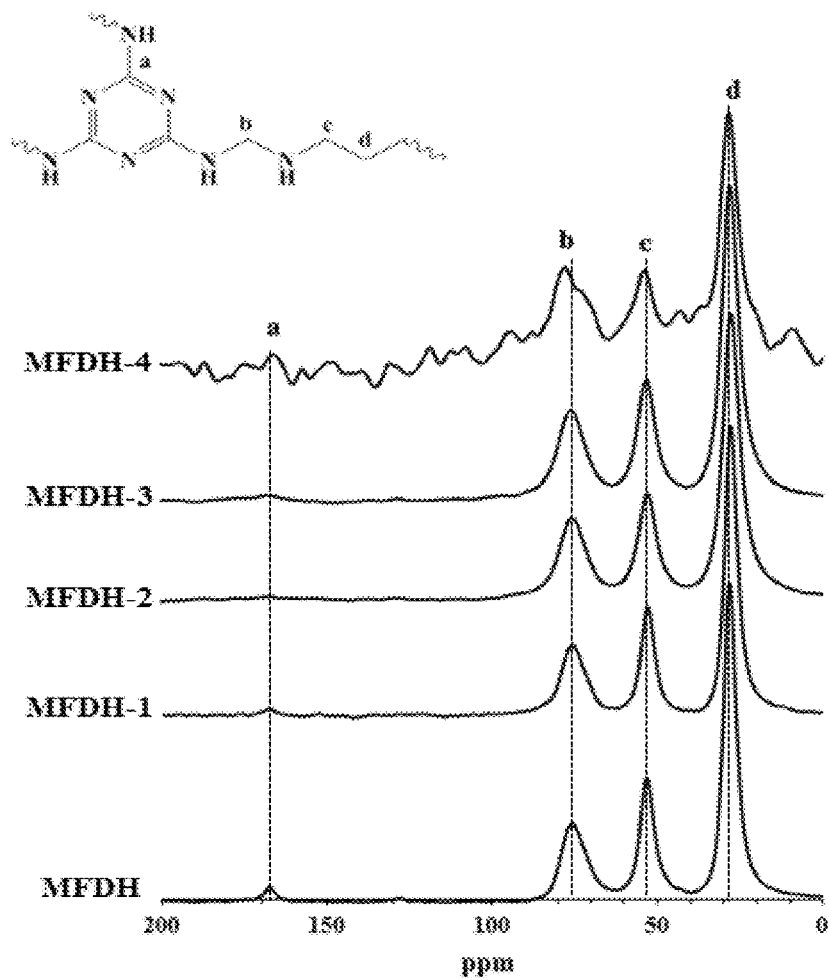

FIG. 3 is an overlay of solid-state $^{13}$C nuclear magnetic resonance ($^{13}$C NMR) spectra of the composites wherein each $R_1$, $R_2$, and $R_3$ are a hydrogen, n is 6, and the weight percentage of the carbon nanotubes relative to the total weight of the composite is 0 (MFDH), about 0.01% (MFDH-1), about 0.02 (MFDH-2), about 0.05 (MFDH-3), and about 0.1% (MFDH-4).

Figure 4:
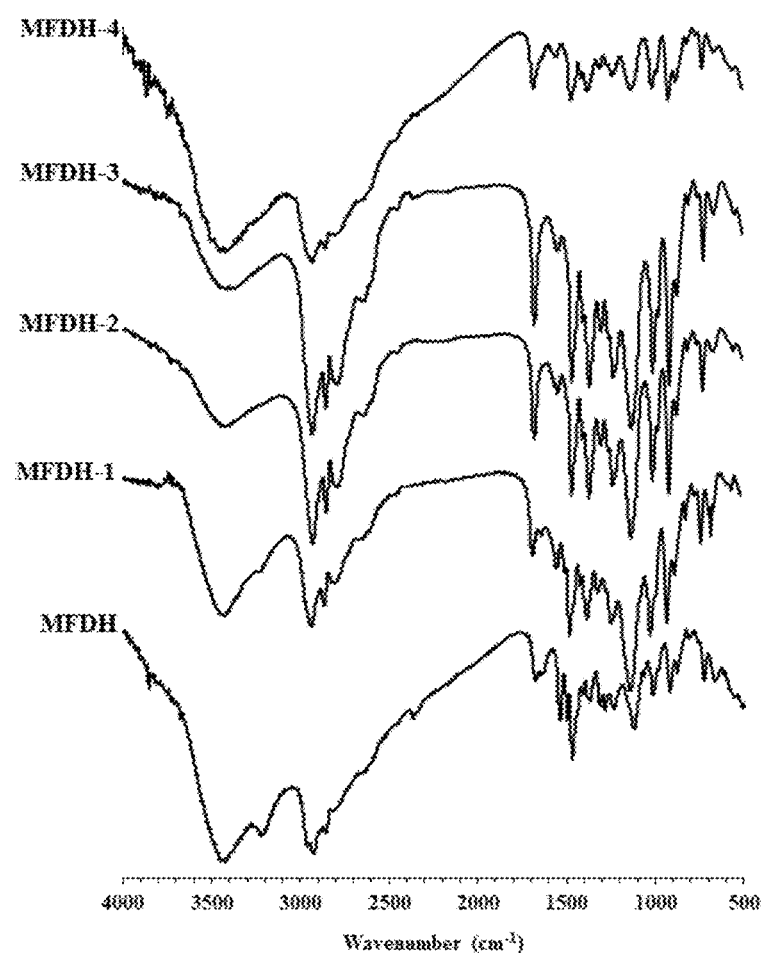

FIG. 4 is an overlay of Fourier transform infrared (FT-IR) spectra of the composites wherein each $R_1$, $R_2$, and $R_3$ are a hydrogen, n is 6, and the weight percentage of the carbon nanotubes relative to the total weight of the composite is 0 (MFDH), about 0.01% (MFDH-1), about 0.02 (MFDH-2), about 0.05 (MFDH-3), and about 0.1% (MFDH-4).

Figure 5:
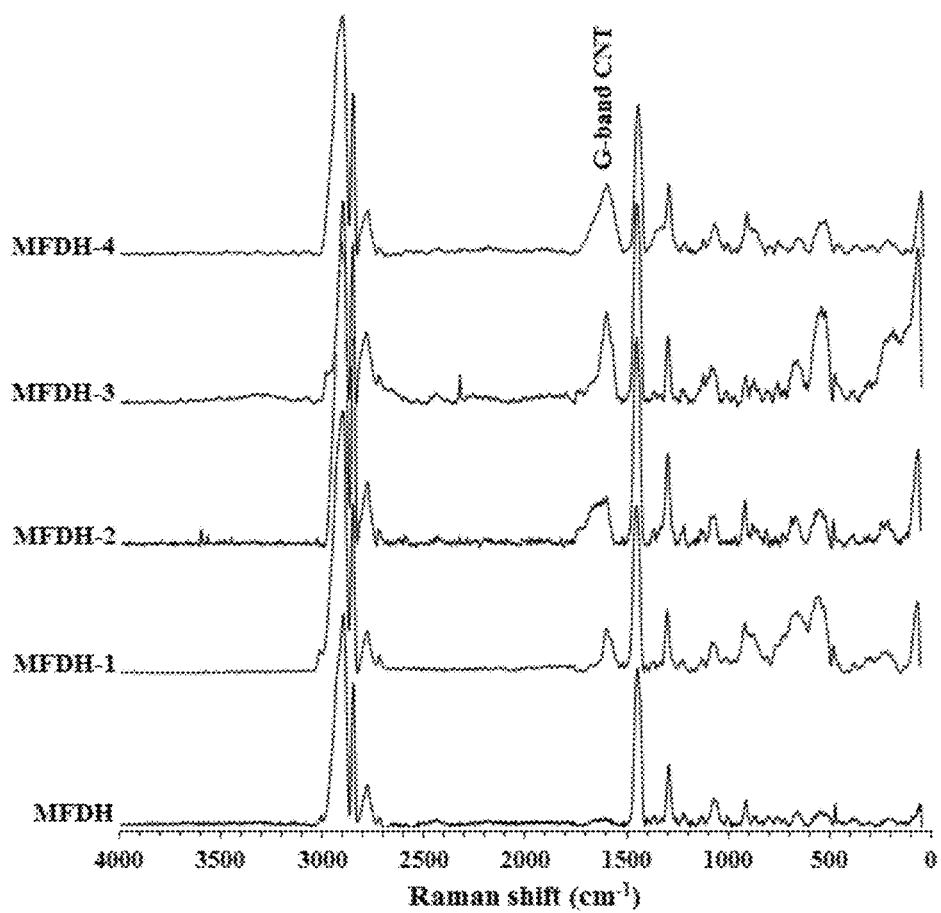

FIG. 5 is an overlay of Raman spectra of the composites wherein each $R_1$, $R_2$, and $R_3$ are a hydrogen, n is 6, and the weight percentage of the carbon nanotubes relative to the total weight of the composite is 0 (MFDH), about 0.01% (MFDH-1), about 0.02 (MFDH-2), about 0.05 (MFDH-3), and about 0.1% (MFDH-4).

Figure 6:
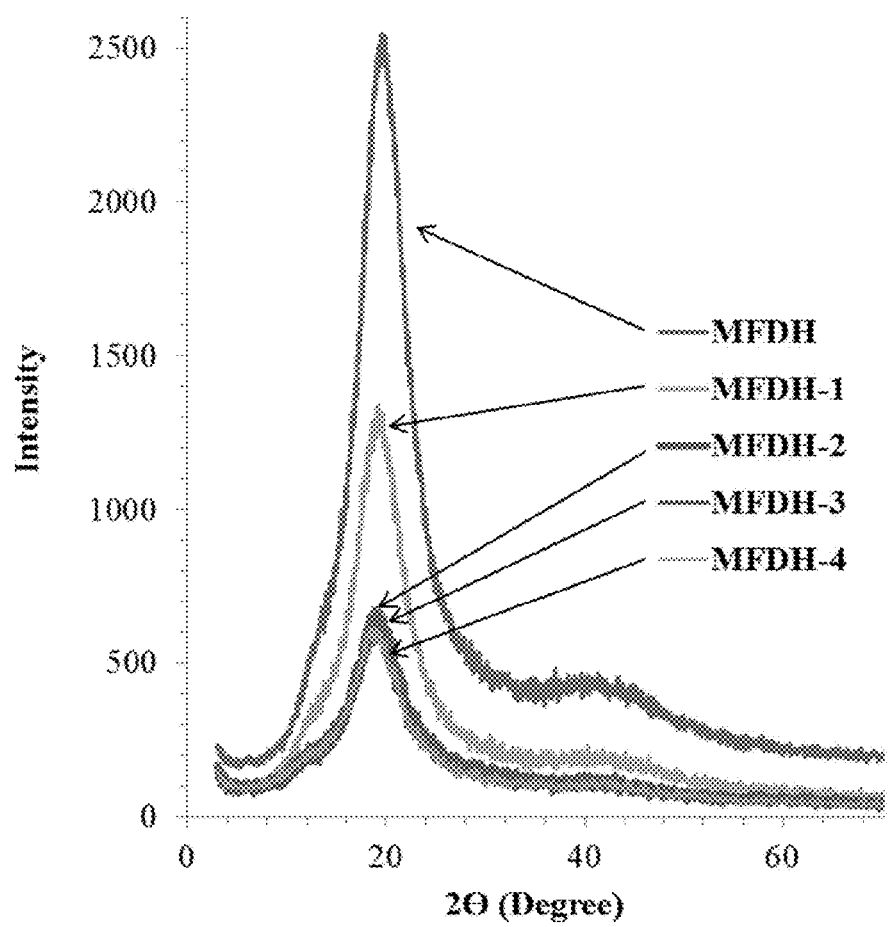

FIG. 6 is an overlay of powder X-ray diffraction (PXRD) patterns of the composites wherein each $R_1$, $R_2$, and $R_3$ are a hydrogen, n is 6, and the weight percentage of the carbon nanotubes relative to the total weight of the composite is 0 (MFDH), about 0.01% (MFDH-1), about 0.02 (MFDH-2), about 0.05 (MFDH-3), and about 0.1% (MFDH-4).

Figure 7:
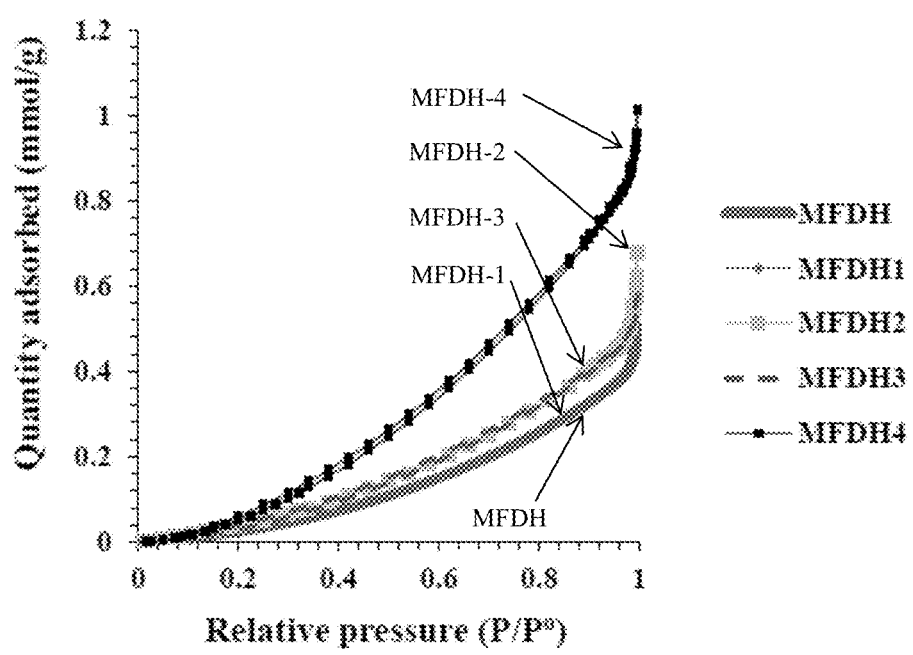

FIG. 7 is an overlay of BET $N_2$ adsorption-desorption isotherms of the composites wherein each $R_1$, $R_2$, and $R_3$ are a hydrogen, n is 6, and the weight percentage of the carbon nanotubes relative to the total weight of the composite is 0 (MFDH), about 0.01% (MFDH-1), about 0.02 (MFDH-2), about 0.05 (MFDH-3), and about 0.1% (MFDH-4).

Figure 8:
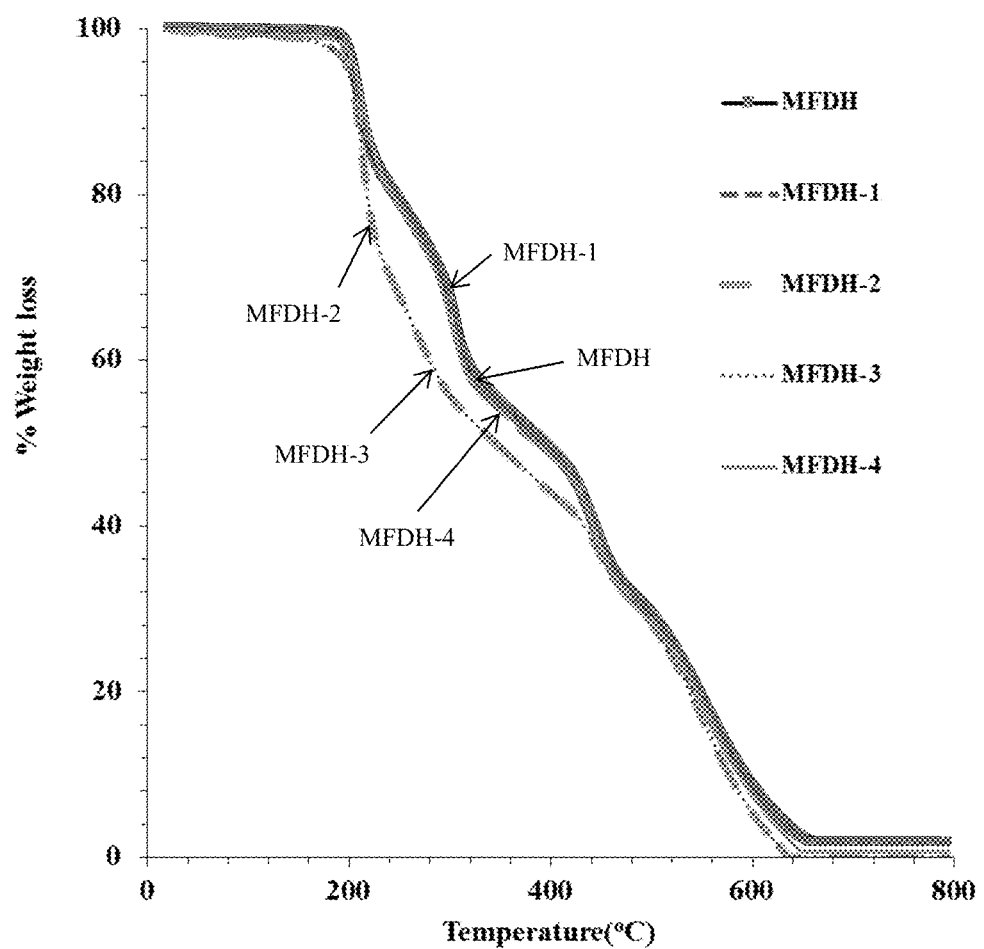

FIG. 8 is an overlay of thermogravimetric analysis (TGA) of the composites wherein each $R_1$, $R_2$, and $R_3$ are a hydrogen, n is 6, and the weight percentage of the carbon nanotubes relative to the total weight of the composite is 0 (MFDH), about 0.01% (MFDH-1), about 0.02 (MFDH-2), about 0.05 (MFDH-3), and about 0.1% (MFDH-4).

Figure 9A:
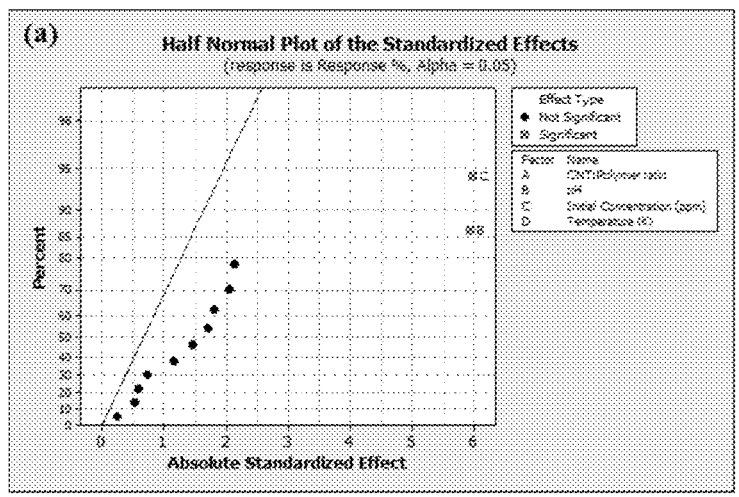

FIG. 9A depicts a half-normal plot of the standardized effect derived from the factorial design experiment.

Figure 9B:
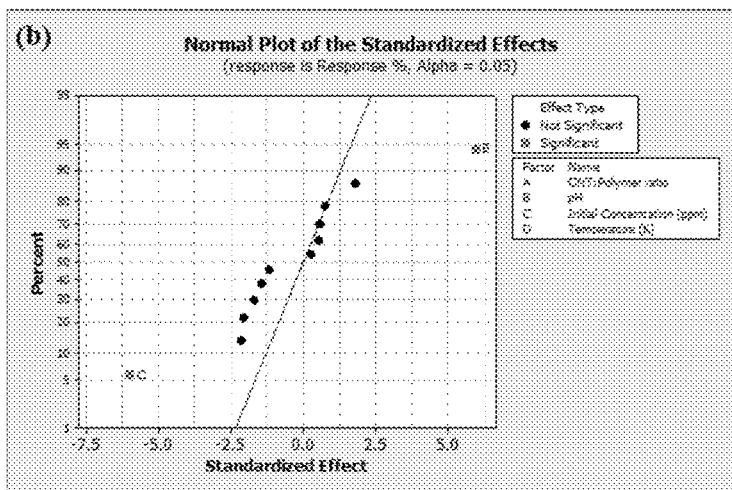

FIG. 9B depicts a normal plot of the standardized effect derived from the factorial design experiment.

Figure 9C:
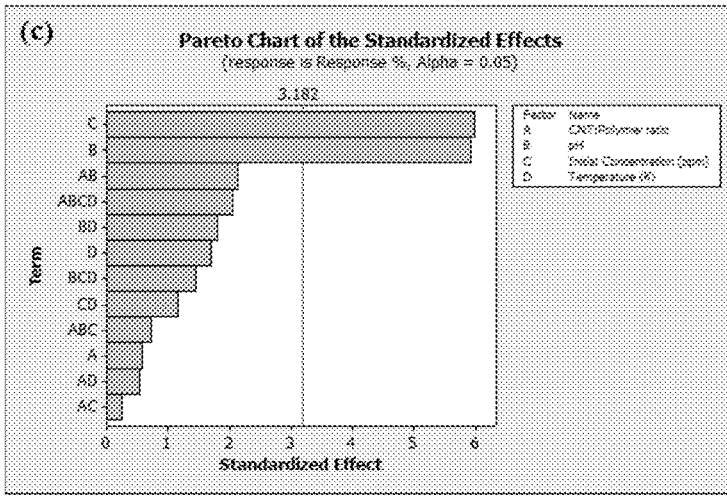

FIG. 9C depicts a Pareto chart of the standardized effect derived from the factorial design experiment.

Figure 10A:
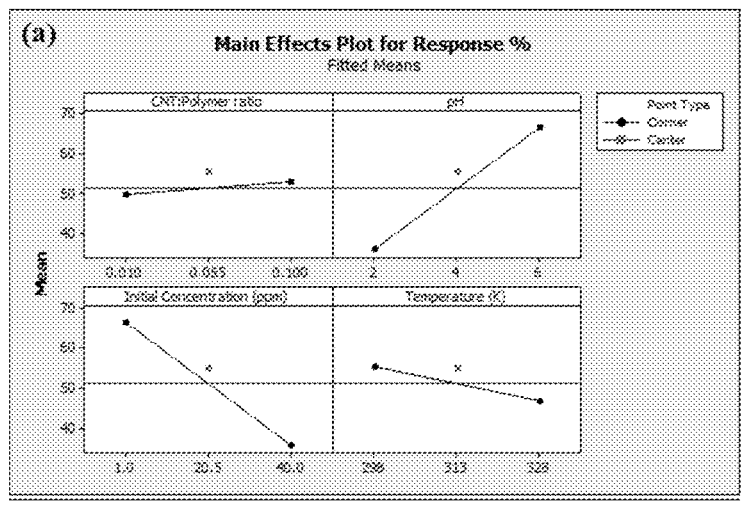

FIG. 10A summarizes main effects including weight percentage of the carbon nanotubes relative to the composite, pH of the aqueous solution, initial concentration of lead ion in the aqueous solution, and temperature on lead ion adsorption efficiency of the composite.

Figure 10B:
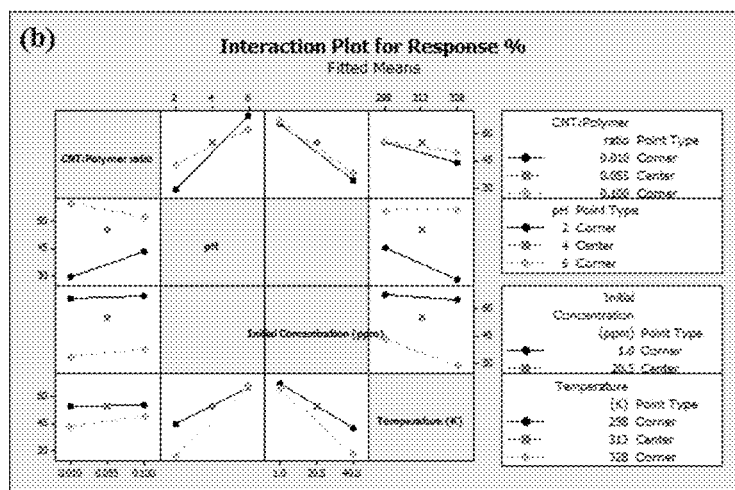

FIG. 10B illustrates interaction effects among factors including weight percentage of the carbon nanotubes relative to the composite, pH of the aqueous solution, initial concentration of lead ion in the aqueous solution, and temperature on lead ion adsorption efficiency of the composite.

Figure 10C:
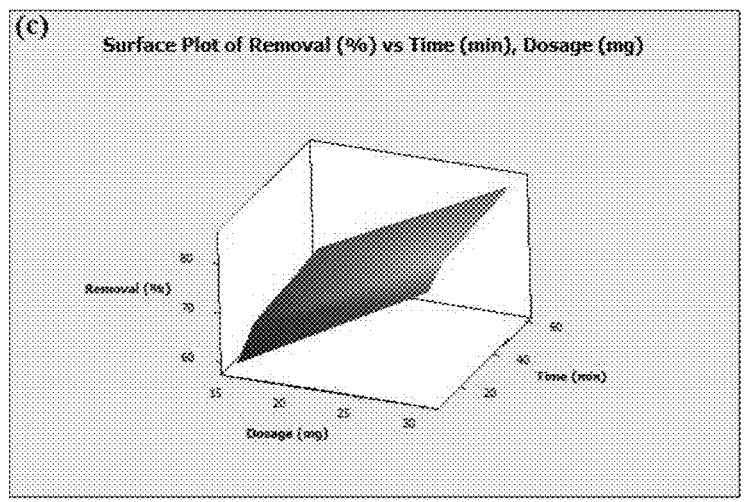

FIG. 10C is a response surface plot demonstrating the effect of contact time and dosage of the composite, as well as their combined impact on the removal of lead ion.

DETAILED DESCRIPTION OF THE EMBODIMENTS

Embodiments of the present disclosure will now be described more fully hereinafter with reference to the accompanying drawings, in which some, but not all embodiments of the disclosure are shown. The present disclosure will be better understood with reference to the following definitions.

Unless otherwise specified, "a" or "an" means "one or more". Within the description of this disclosure, where a numerical limit or range is stated, the endpoints are included unless stated otherwise. Also, all values and subranges within a numerical limit or range are specifically included as if explicitly written out.

As used herein, the term "compound" refers to a chemical entity, whether in a solid, liquid or gaseous phase, and whether in a crude mixture or purified and isolated.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those skilled in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-) stereoisomers of the compounds of the present disclosure wherein rotation around the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

The present disclosure is further intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, and isotopes of nitrogen include $^{14}N$ and $^{15}N$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, aubstituted aralkanoylamino, thiol, alkylthio, arylthio, arylalkylthio, alkylthiono, arylthiono, aryalkylthiono, alkyl sulfonyl, aryl sulfonyl, arylalkylsulfonyl, sulfonamide (e.g. —$SO_2NH_2$), substituted sulfonamide, nitro, cyano, carboxy, carbamyl (e.g. —$CONH_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like.

As used herein, the term "alkyl" unless otherwise specified refers to both branched and straight chain saturated aliphatic primary, secondary, and/or tertiary hydrocarbons of typically $C_1$ to $C_{12}$, preferably $C_2$ to $C_8$, and specifically includes, but is not limited to, methyl, trifluoromethyl, ethyl, n-propyl, isopropyl, n-butyl, sec-butyl, isobutyl, t-butyl, pentyl, isopentyl, neopentyl, hexyl, isohexyl, 3-methylpentyl, 2,2-dimethylbutyl, and 2,3-dimethylbutyl.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, halide, sulfonic acid, sulfate, phosphonic acid, phosphate or phosphonate or mixtures thereof. The substituted moiety may be either protected or unprotected as necessary, and as known to those skilled in the art.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

According to a first aspect, the present disclosure relates to a composite, which is a polycondensation product formed by a reaction of (i) melamine, (ii) an aldehyde of formula (I)

(I)

or a salt, solvate, or stereoisomer thereof, (iii) a diaminoalkane of formula (II)

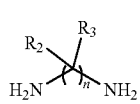

or a salt, solvate, tautomer or stereoisomer thereof, and (iv) carbon nanotubes comprising activated carbonyl groups, wherein $R_1$ is selected from the group consisting of a hydrogen, an optionally substituted alkyl, an optionally substituted cycloalkyl, and an optionally substituted aryl, $R_2$ is selected from the group consisting of a hydrogen, an optionally substituted alkyl, an optionally substituted cycloalkyl, an optionally substituted aryl, and an optionally substituted arylalkyl, $R_3$ is selected from the group consisting of a hydrogen, an optionally substituted alkyl, an optionally substituted cycloalkyl, an optionally substituted aryl, and an optionally substituted arylalkyl, n is a positive integer in the range of 2-12, and a weight percentage of the carbon nanotubes relative to a total weight of the composite is 0.005 wt % to 0.5 wt %.

As used herein, the value of n denotes an alkyl chain of —$CR_2R_3$— groups. In a preferred embodiment, n is a positive integer in the range of 2-12, preferably 3-10, preferably 4-8, preferably 5-7, preferably n is 6. In some embodiments, the alkyl chain may have more than 12 carbon atoms, e.g. 14, 16, 18, or 20 carbon atoms.

In a preferred embodiment, $R_1$ is selected from the group consisting of a hydrogen, an optionally substituted alkyl, an optionally substituted cycloalkyl, and an optionally substituted aryl, most preferably each $R_1$ is a hydrogen. In a preferred embodiment, $R_2$ is selected from the group consisting of a hydrogen, an optionally substituted alkyl, an optionally substituted cycloalkyl, an optionally substituted aryl, and an optionally substituted arylalkyl, most preferably each $R_2$ is a hydrogen. In a preferred embodiment, $R_3$ is selected from the group consisting of a hydrogen, an optionally substituted alkyl, an optionally substituted cycloalkyl, an optionally substituted aryl, and an optionally substituted arylalkyl, most preferably $R_3$ is a hydrogen.

In a preferred embodiment, the weight percentage of the carbon nanotubes relative to a total weight of the composite is 0.005 wt % to 0.5 wt %, preferably 0.0075 wt % to 0.4 wt %, preferably 0.01 wt % to 0.3 wt %, preferably 0.02 wt % to 0.25 wt %, preferably 0.04 wt % to 0.2 wt %, preferably 0.05 wt % to 0.1 wt %.

In a preferred embodiment, each $R_1$, $R_2$, and $R_3$ are a hydrogen, n is a positive integer in the range of 4-8, and the weight percentage of the carbon nanotubes relative to the total weight of the composite is 0.0075 wt % to 0.2 wt %. In a more preferred embodiment, each $R_1$, $R_2$, and $R_3$ are a hydrogen, n is 6, and the weight percentage of the carbon nanotubes relative to the total weight of the composite is about 0.1 wt % to 0.2 wt %.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the individual components.

Carbon nanotubes (CNTs) are members of the fullerene family. The name refers to their long, hollow structure with the "walls" formed by one-atom-thick sheets of carbon, called graphene. These sheets are rolled at specific and discrete ("chiral") angles, and the combination of the rolling angle and radius determines the nanotube properties. Individual nanotubes naturally align themselves into "ropes" held together by van der Waals forces and pi-stacking. Nanotubes are categorized as single-walled nanotubes (SWNTs) and multi-walled nanotubes (MWNTs). In one or more embodiments, the composite of the present disclosure comprises carbon nanotubes which are at least one selected from the group consisting of multi-walled carbon nanotubes and single-walled carbon nanotubes.

Single-walled nanotubes typically have a diameter of close to 1 nm and a tube length of up to many millions of times longer. The structure of a single-walled nanotube can be conceptualized by wrapping a one-atom-thick layer of graphite called graphene into a seamless cylinder. In practice, the way the graphene sheet is wrapped is represented by a pair of indices (x, y). The integers x and y denote the number of unit vectors along two directions in the honeycomb crystal lattice of graphene. If x=0, the nanotubes are called zigzag nanotubes, and if x=y, the nanotubes are called armchair nanotubes. Otherwise they are called chiral.

Multi-walled nanotubes consist of multiple rolled layers (concentric tubes) of graphene. There are two models that can be used to describe the structures of multi-walled nanotubes. In the Russian Doll model, sheets of graphite are arranged in concentric cylinders, for example, a single-walled nanotube within a larger single-walled nanotube. In the Parchment model, a single sheet of graphite is rolled in around itself, resembling a scroll of parchment or a rolled newspaper. The interlayer distance in multi-walled nanotubes is close to the distance between graphene layers in graphite. The Russian Doll structure is observed more commonly, its individual shells can be described as SWNTs.

In one or more embodiments, the composite of the current disclosure comprises carbon nanotubes with an average diameter of 0.5-200 nm, preferably 1-150 nm, preferably 5-125 nm, preferably 10-100 nm, preferably 20-80 nm, preferably 30-70 nm, preferably 40-60 nm and an average length of 1 um-50 mm, preferably 5 um-25 mm, preferably 10 um-1 mm, preferably 20-500 um, preferably 30-400 um, preferably 40-300 um, preferably 50-300 um, preferably 60-200 um, preferably 60-200 um, preferably 70-100 um. In at least one embodiment, the carbon nanotubes used herein have a length-to-diameter ratio of up to 500:1, preferably up to 1,000:1, preferably up to 10,000:1, preferably up to 100,000:1, preferably up to 1,000,000:1, preferably up to 10,000,000:1, preferably up to 100,000,000:1.

In addition to single-walled carbon nanotubes and multi-walled carbon nanotubes it is envisaged that the present disclosure may be adapted to incorporate other types and related structures of carbon nanotubes including, but not limited to, a carbon nanotorus, a carbon nanobud, a 3D macroscopic carbon nanotube architecture, graphenated carbon nanotubes (g-CNTs), nitrogen-doped carbon nanotubes, a carbon peapod, cup-stacked carbon nanotubes, extreme carbon nanotubes and mixtures thereof.

CNTs and graphene oxides have been used as modifiers for reinforcing polymers due to their excellent mechanical properties, high surface area and thermal stability (Alhwaige, A. A., Alhassan, S. M., Katsiotis, M. S., Ishida, H., Qutubuddin, S., 2015. Interactions, morphology and thermal stability of graphene-oxide reinforced polymer aerogels derived from star-like telechelic aldehyde-terminal benzoxazine resin, RSC Advances 5, 92719-92731; Mylvaganam, K., Zhang, L. C., 2007. Fabrication and application of polymer composites comprising carbon nanotubes, Recent patents on nanotechnology 1, 59-65; and Tasis, D., Tagmatarchis, N., Bianco, A., Prato, M., 2006. Chemistry of carbon nanotubes, Chem. Rev. 106, 1105-1136, each incorporated herein by reference in their entirety). In one or more embodiments, the composite described herein is derived from a polymeric network which is reinforced with inorganic CNTs through covalent functionalization.

As used herein, covalent functionalization is based on the formation of a covalent linkage between organic entities and the carbon skeleton of carbon nanotubes. It could also be divided into direct covalent sidewall functionalization and indirect covalent functionalization with carboxylic groups on the surface of carbon nanotubes. These carboxylic groups might have existed on the as-grown CNTs, and may be further generated through oxidative reactions. Alternatively, direct covalent sidewall functionalization is associated with a change in hybridization from $sp^2$ to $sp^a$ and a simultaneous loss of conjugation. In terms of the present disclosure, the covalent functionalization takes advantage of chemical conversion of carboxylic groups to activated carbonyl groups on the surface of nanotubes in order to increase their reactivity. Exemplary activated carbonyl groups include, but are not limited to, acyl halides, carboxylic anhydrides, carboxylic acids and esters. In a preferred embodiment, the activated carbonyl group is an acyl halide group.

Raw CNTs lacking any covalent functionalization can be modified non-covalently as well, which is mainly based on supramolecular complexation using various adsorption forces, such as van der Waals force, electrostatic force and pi-stacking interactions. Non-covalent functionalization has advantages that it could be operated under relatively mild reaction conditions and the graphitic structure of CNTs could be maintained. It is envisaged that the present disclosure may be adapted or chemically modified to incorporate CNTs in a polymeric network through a non-covalent functionalization.

The polymeric network of the current disclosure is generally built on a melamine-based polyamine terpolymer which may be a polycondensation product of melamine, an aldehyde of formula (I) and a diaminoalkane of formula (II). In most embodiments, the melamine-based polyamine includes —NH— groups that readily form covalent linkages with activated carbonyl groups on the CNTs. In one or more embodiments, the —NH— group participating in the aforementioned covalent linkage formation can originate from an amino group on either the diaminoalkane or the melamine moiety in the melamine-based polyamine.

As used herein the term "repeat unit" or "repeating unit" refers to a part of the polymer or resin whose repetition would produce the complete polymer chain (including or excluding the end groups) by linking the repeating units together successively along the chain. Monomers are molecules which can undergo polymerization, thereby contributing constitutional repeating units to the structures of a macromolecule or polymer. The process by which monomers combine end to end to form a polymer is referred to herein as "polymerization" or "polycondensation". As used herein a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc.

In a preferred embodiment, the diaminoalkane of formula (II) is present in a molar excess to melamine. In one embodiment, the molar ratio of the diaminoalkane of formula (II) to melamine is in the range of 1:1 to 5:1, preferably 1.5:1 to 4.5:1, preferably 2:1 to 4:1, preferably 2.5:1 to 3.5:1, or about 3:1. In a preferred embodiment, the aldehyde of formula (i) is present in a molar excess to melamine. In one embodiment, the molar ratio of the aldehyde to melamine is in the range of 2:1 to 10:1, preferably 3:1 to 9:1, preferably 4:1 to 8:1, preferably 5:1 to 7:1, or about 6:1.

An exemplary structure of the composite disclosed herein may be represented by formula (III)

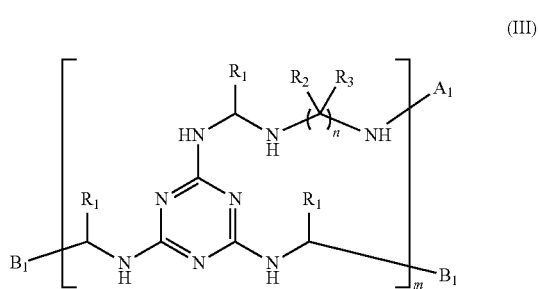

or a salt thereof, a solvate thereof, a tautomer thereof, a stereoisomer thereof, or a mixture thereof, wherein (i) $A_l$ is covalently bonded to the carbon nanotubes via an activated carbonyl or bonded to $B_1$ of another monomer unit, (ii) $R_1$ is selected from the group consisting of a hydrogen, an optionally substituted alkyl, an optionally substituted cycloalkyl, and an optionally substituted aryl, (iii) $R_2$ is selected from the group consisting of a hydrogen, an optionally substituted alkyl, an optionally substituted cycloalkyl, an optionally substituted aryl, and an optionally substituted arylalkyl, (iv) $R_3$ is selected from the group consisting of a hydrogen, an optionally substituted alkyl, an optionally substituted cycloalkyl, an optionally substituted aryl, and an optionally substituted arylalkyl, (v) n is a positive integer in the range of 2-12, (vi) m is a positive integer in the range of 2-10000, and (vii) a weight percentage of the carbon nanotubes relative to the composite is 0.005 wt % to 0.5 wt %.

As used herein, the term "degree of polymerization" refers to the number of repeating units in a polymer. In a preferred embodiment, degree of polymerization m is a positive integer in the range of 2-10000, preferably 2-5000, preferably 2-2500, preferably 2-1000, preferably 2-500, preferably 2-400, preferably 3-300, preferably 4-275, preferably 5-250, preferably 10-200, preferably 15-150, preferably 20-100, preferably 25-50. It is equally envisaged that values for m may fall outside of these ranges and still provide suitable composites as exemplified by formula (III). In a preferred embodiment, the composite of the present disclosure may have a wide molecular weight distribution. In one embodiment, the composite of the present disclosure has an average molecular weight of 4-200 kDa, preferably 10-150 kDa, preferably 10-100 kDa, preferably 10-75 kDa, more preferably 10-50 kDa, more preferably 20-35 kDa.

A polymer may be loosely described as crystalline if it contains regions of three-dimensional ordering on atomic (rather than macromolecular) length scales, usually arising from intramolecular folding and/or stacking of adjacent chains. A degree of crystallinity may be expressed in terms of a weight fraction of volume fraction of crystalline material. The crystallinity of polymers may be characterized by their degree of crystallinity, ranging from zero for a completely amorphous (non-crystalline) polymer to one for a theoretical completely crystalline polymer.

The composite described herein may contain both crystalline and amorphous regions. In a preferred embodiment, the composite of the present disclosure exhibits a semi-crystalline structure. In a preferred embodiment, the composite of the present disclosure has a degree of crystallinity in the range of 0.1-0.8, preferably 0.2-0.6, preferably 0.3-0.5. In some embodiments, the degree of crystallinity of the composite described herein may decrease as the weight percentage of the carbon nanotubes relative to the total weight of the composite increases. Methods for evaluating the degree of crystallinity include, but are not limited to differential scanning calorimetry (DSC), X-ray diffraction (XRD), infrared (IR) spectroscopy, and nuclear magnetic resonance (NMR) spectroscopy. The distribution of crystalline and amorphous regions of a polymer may be further visualized with microscopic techniques, such as polarized light microscopy and transmission electron microscopy (TEM).

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, BET surface area is measured by gas adsorption analysis, preferably $N_2$ adsorption analysis. In a preferred embodiment, the composite of the present disclosure has an average BET surface area of 4-50 $m^2/g$, preferably 5-40 $m^2/g$, preferably 7-30 $m^2/g$, preferably 9-25 $m^2/g$, preferably 10-20 $m^2/g$, preferably 11-18 $m^2/g$, preferably 12-16 $m^2/g$. In most embodiments, the BET surface area of the composite disclosed herein increases as the weight percentage of the carbon nanotubes relative to the total weight of the composite increases.

According to a second aspect, the present disclosure relates to a method of preparing the composite wherein the activated carbonyl group is an acyl halide group, comprising (i) reacting carboxylated carbon nanotubes with one or more thionyl halides to form carbon nanotubes having acyl halide groups, and (ii) reacting the carbon nanotubes having acyl halide groups with a diaminoalkane of formula (II)

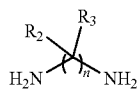
(II)

or a salt, solvate, tautomer or stereoisomer thereof in the presence of an aldehyde of formula (I)

(I)

or a salt, solvate, or stereoisomer thereof, and melamine to form the composite, wherein (i) $R_1$ is selected from the group consisting of a hydrogen, an optionally substituted alkyl, an optionally substituted cycloalkyl, and an optionally substituted aryl, (ii) $R_2$ is selected from the group consisting of a hydrogen, an optionally substituted alkyl, an optionally substituted cycloalkyl, an optionally substituted aryl, and an optionally substituted arylalkyl, and (iii) $R_3$ is selected from the group consisting of a hydrogen, an optionally substituted alkyl, an optionally substituted cycloalkyl, an optionally substituted aryl, and an optionally substituted arylalkyl.

Carboxylated carbon nanotubes used herein may be commercially available from a variety of sources (e.g. Sigma Aldrich, Nanocyl Inc, and VWR International) or prepared in-house according to published methods known to one of ordinary skill in the art. For example, carboxylated carbon nanotubes may be prepared by dispersing CNTs in a concentrated acid, e.g. HF, $HNO_3$, $H_2SO_4$, $H_3PO_4$, $HClO_4$, and mixtures thereof, thereby forming a mixture. The mixture may be agitated and/or heated at 60° C. to 200° C., 80° C. to 160° C., 100° C. to 140° C., or at around 120° C. for 1-48 hours, 2-36 hours, 4-24 hours, or 6-12 hours to form a reaction mixture. Carboxylated carbon nanotubes may be collected from the reaction mixture and further purified using methods known to one skilled in the art. The extent of carboxyl functionalization is dependent upon a number of factors, e.g. the reactivity of CNTs, the reactivity of functionalizing agent, steric effect, etc. The extent of carboxyl functionalization is characterized by a percentage of the number of carboxyl functionalized carbon atoms relative the total number of carbon atoms in a CNT. In some embodiments, a percentage of carboxyl functionalization is in the range of 0.1-30%, preferably 1-20%, preferably 5-15% of carboxyl functionalized carbon atoms relative to the total number of carbon atom in the CNT described herein. The extent of carboxyl functionalization may be determined by various analytical tools including, but not limited to, scanning tunneling microscopy (SEM), atomic force microscopy (AFM), X-ray photoelectron spectroscopy (XPS), XRD, Raman spectroscopy, $^{13}C$-NMR spectroscopy, IR spectroscopy, and acid-base titration.

In one or more embodiment, carbon nanotubes with acyl halide groups can be prepared by reacting the carboxylated carbon nanotubes in the presence of a thionyl halide such as thionyl chloride and thionyl bromide at 25° C. to 100° C., 35° C. to 95° C., 45° C. to 85° C., or 55° C. to 75° C. In a preferred embodiment, the thionyl halide is present in a molar excess to the carboxylated carbon nanotubes. In one embodiment, the molar ratio of the thionyl halide to the carboxylated carbon nanotubes is 2:1 to 1,000:1, 3:1 to 750:1, 4:1 to 500:1, 5:1 to 100:1, 6:1 to 50:1, 7:1 to 25:1, 8:1 to 15:1, or 10:1 to 12:1.

In a preferred embodiment, reacting the carbon nanotubes with acyl halide groups with the diaminoalkane in the presence of the aldehyde and melamine to form the composite is performed in a polar solvent under agitation, preferably in dimethylformamide (DMF) for 0.1-12 hours, 0.2-6 hours, 0.5-4 hours, or 1-3 hours. Exemplary additional polar solvents that may be used in addition to, or in lieu of DMF include, but are not limited to, tetrahydrofuran, ethyl acetate, acetone, acetonitrile, dimethyl sulfoxide, nitromethane and propylene carbonate, methanol, n-butanol, isopropanol, n-propanol, ethanol, or mixtures thereof. It is equally envisaged that the reaction may be adapted to be performed in a non-polar solvent (i.e. pentane, cyclopentane, hexane, cyclohexane, benzene, toluene, 1,4-dioxane, chloroform, diethyl ether, dichloromethane, and mixtures thereof). In a preferred embodiment, the reaction is performed at a concentration of melamine in the range of 0.01-10.0 M, preferably 0.05-5.0 M, preferably 0.10-2.0 M, preferably 0.20-

1.0 M, preferably 0.3-0.5 M. In a preferred embodiment, the composite is collected as a resinous material that may be separated (filtered off), crushed, soaked and washed in DMF, water and acetone, and then filtered and dried. In one embodiment, the resinous material may be dried under vacuum at 20-100° C., preferably 40-80° C., or about 60° C. until a constant weight is achieved. In a preferred embodiment, the reaction of forming the composite has a product yield of at least 50%, preferably at least 60%, preferably at least 65%, preferably at least 70%, preferably at least 75%, preferably at least 80%, preferably at least 85%, preferably at least 90%. The product yield is calculated as (mass of product/total mass of reactants)×100%.

Methods of agitating a reaction mixture include, without limitation, using an agitator, a vortexer, a rotary shaker, a magnetic stirrer, a centrifugal mixer, or an overhead stirrer. In one embodiment, the mixture is mixed with a spatula. In another embodiment, the mixture is agitated using a magnetic stirrer with a rotational speed of at least 250 rpm, preferably at least 400 rpm, more preferably at least 600 rpm. In another embodiment, the mixture is left to stand without being stirred. In a preferred embodiment, the mixture is agitated by sonication in an ultrasonic bath or with an ultrasonic probe.

In a preferred embodiment, the diaminoalkane of formula (II) is present in a reaction of forming the composite in a molar excess to melamine. In one embodiment, the molar ratio of the diaminoalkane to melamine is in the range of 1:1 to 5:1, preferably 1.5:1 to 4.5:1, preferably 2:1 to 4:1, preferably 2.5:1 to 3.5:1, or about 3:1. In a preferred embodiment, the aldehyde of formula (I) is present in a reaction of forming the composite in a molar excess to melamine. In one embodiment, the molar ratio of the aldehyde to melamine is in the range of 2:1 to 10:1, preferably 3:1 to 9:1, preferably 4:1 to 8:1, preferably 5:1 to 7:1, or about 6:1.

According to a third aspect, the present disclosure relates to a method for removing a heavy metal from an aqueous solution, comprising (i) contacting the aqueous solution having an initial concentration of the heavy metal with the composite to form a mixture, and (ii) filtering the mixture to obtain an aqueous solution having a reduced concentration of the heavy metal compared to the initial concentration.

Non-limiting examples of aqueous solutions (i.e. heavy metal contaminated aqueous solutions), water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. Methods for removing heavy metals from aqueous solutions according to the present disclosure include contacting the composite of the present disclosure in any of its embodiments with heavy metal contaminated water sources and systems. The methods may be carried out in tanks, containers, or small scale applications in both batch mode and fixed-bed or column mode.

The performance of an adsorbent material, polymers inclusive, is largely dependent on the type of functionality it carries. The presence of chelating functionalities such as amine, carbonyl, thiocarbamate, thiol, and phosphoryl moieties is known to enhance the performance of materials towards the removal of heavy metal ions from aqueous solutions (Akintola, O. S., Saleh, T. A., Khaled, M. M., Al Hamouz, O. C. S., 2016. Removal of mercury(II) via a novel series of cross-linked polydithiocarbamates, Journal of the Taiwan Institute of Chemical Engineers 60, 602-616; Ali, S. A., Al Hamouz, O. C. S., Hassan, N. M., 2013. Novel cross-linked polymers having pH-responsive amino acid residues for the removal of $Cu^{2+}$ from aqueous solution at low concentrations, Journal of Hazardous Materials 248-249, 47-58; and Cheong, I. W., Shin, J. S., Kim, J. H., Lee, S. J., 2004. Preparation of monodisperse melamine-formaldehyde microspheres via dispersed polycondensation, Macromolecular Research 12, 225-232, each incorporated herein by reference in their entirety). These moieties have a known ability to form strong complexes/chelates with heavy metal ions. In general nitrogen-containing compounds exhibit a significant affinity towards heavy metals. Melamine-formaldehyde-dietheylenetriaminepentaacetic acid copolymer for heavy metals removal is a good illustration of an amine moiety chelating with divalent toxic metal ions to aid removal via adsorption (Baraka, A., Hall, P. J., Heslop, M. J., 2007. Preparation and characterization of melamine-formaldehyde-DTPA chelating resin and its use as an adsorbent for heavy metals removal from wastewater, Reactive and Functional Polymers 67, 585-600, incorporated herein by reference in its entirety). The performance of this class of adsorbents is contributable to a combination of strong covalent bonds formed by melamine-formaldehyde polymerization and the presence of free amine ends (Ming, G., Duan, H., Meng, X., Sun, G., Sun, W., Liu, Y., Lucia, L., 2016. A novel fabrication of monodisperse melamine-formaldehyde resin microspheres to adsorb lead(II), Chemical Engineering Journal, 288, 745-757, incorporated herein by reference in its entirety). However, unsatisfactory thermal stability, life span and mechanical strength of this class of adsorbents limit its effective function at relatively high temperatures or over long periods of time.

Carbon nanotubes exhibit strong adsorption affinities to a wide range of contaminants including heavy metals in water. The large adsorption capacity of CNTs for heavy metals is primarily due to their concentrated pore distributions and large surface areas. They show similar adsorption capacities as activated carbons in the presence of natural organic matter. Furthermore, CNTs exhibit good mechanical properties and chemical stabilities even under extreme conditions (e.g., high temperature and strong acidic or basic conditions). Embedding CNTs in a polymeric network through covalent functionalization helps CNTs dispersing in an aqueous environment, and provide thermal stability and mechanical durability to the resulting composite.

In a preferred embodiment, a heavy metal has a density of greater than 3.5 g/cm$^3$ and/or an atomic weight of greater than 20. Exemplary metal ions that can be adsorbed by the composite of the present disclosure are of a wide range and include, but are not limited to, ions of Ag, Na, Pb, Mn, Fe, Co, Ni, Cu, Sn, Cd, Hg, Cr, Fe, As, Sb, Cr, Zn, V, Pt, Pd, Rh and mixtures thereof in various oxidation states such as +1, +2 and +3. Further, these metal ions may be of any oxidation state $M^{+1}$, $M^{+2}$, $M^{+3}$, etc. In a preferred embodiment, the heavy metal is an ion of at least one heavy metal selected from the group consisting of Pb, Cd, As, Zn, Cu, Ni, Co, Mn, and Cr, most preferably the heavy metal is Pb(II). It is equally envisaged that the composite may be adapted or chemically modified to adsorb, incorporate and/or bind additional metal ions in addition to, or in lieu of Pb(II) and may bind selectively or collectively. In one embodiment, the additional metal ion may be any ion which is suitably coordinated by the composite disclosed herein in any of its embodiments. Exemplary additional metal ions include, but are not limited to, ions of an alkali metal (Li, Na, K, etc.), an alkaline earth metal (Mg, Ca, Sr, etc.), a lanthanide metal (La, Ce, Eu, Yb, etc.), an actinide metal (Ac, Th, etc.), or a post-transition metal (Al, Sn, In, etc.). Preferably the additional metal ion is a transition metal ion, most preferably a heavy metal ion.

As used herein, adsorption is the adhesion of atoms, ions or molecules from a gas, liquid, or dissolved solid to a surface. The process creates a film of an adsorbate (i.e. heavy metal ions) on the surface of an adsorbent (i.e. the composite). This process differs from absorption, in which a fluid (the absorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof. In at least one embodiment, the heavy metal ion is removed by physisorption with the composite of the current disclosure, meaning the process is primarily physical and preferably no chemical changes occur on the composite or the metal ion.

In one or more embodiments, the composite of the current disclosure is present in the aqueous solution at a concentration in the range of 0.1-25 grams per liter volume of the aqueous solution during the contacting, preferably 0.2-20 g $L^{-1}$, preferably 0.5-10 g $L^{-1}$, preferably 1-5 g $L^{-1}$, or about 1.5 grams per liter volume of the aqueous solution during the contacting.

In one or more embodiments, the method for removing heavy metal is carried out in an aqueous solution with a pH in the range of 1 to 7, preferably a pH in the range of 2 to 7, more preferably a pH in the range of 2 to 6.

In one or more embodiments, the composite of the present invention is effective in adsorbing heavy metal ions in an aqueous solution within a temperature range of 10-100° C., preferably 15-90° C., preferably 20-80° C., preferably 25-70° C. In a preferred embodiment, the composite is contacted with the aqueous solution at a temperature in the range of 15-85° C., preferably 25-55° C., preferably 35-45° C. Within the effective temperature range, increasing the temperature may increase the removal of heavy metals.

In a preferred embodiment, the composite of the present disclosure is contacted with the aqueous solution for 0.1 to 24 hours, preferably 0.2-12 hours, preferably 0.25-10 hours, preferably 0.5-8 hours, preferably 0.75-6 hours, preferably 1-4 hours, preferably 2-3 hours.

In a preferred embodiment, the composite is effective in removing heavy metal from aqueous samples wherein the initial concentration of the heavy metal ion, preferably Pb(II), in the aqueous solution is in the range of 0.01-1,000 mg $L^{-1}$, preferably 0.1-500 mg $L^{-1}$ preferably 1-400 mg $L^{-1}$, preferably 2.5-300 mg $L^{-1}$, preferably 5-200 mg $L^{-1}$, preferably 10-100 mg $L^{-1}$.

In one or more embodiments, greater than 25% of a total mass of the heavy metal is removed from the aqueous solution at the end of the adsorption process following contacting, preferably greater than 30%, preferably greater than 40%, preferably greater than 50%, preferably greater than 60%, preferably greater than 70%, preferably greater than 80%, preferably greater than 90%, preferably greater than 92%, preferably greater than 94%, preferably greater than 96%, preferably greater than 97%, preferably greater than 98%, preferably greater than 99% of a total mass of the heavy metal is removed from the aqueous solution at the end of the adsorption process following contacting.

In one or more embodiments, the adsorption of Pb(II) by the composite of the present disclosure in an aqueous solution increases as the weight percentage of the carbon nanotubes relative to the total weight of the composite increases. In a preferred embodiment, each $R_1$, $R_2$, and $R_3$ are a hydrogen, n is 6, and the weight percentage of the carbon nanotubes relative to the total weight of the composite is about 0.1 wt % to 0.2 wt %, the aqueous solution has Pb(II) and at least one additional heavy metal ion, which is an ion of at least one heavy metal selected from the group consisting of Cd, As, Zn, Cu, Ni, Co, Mn, and Cr, and greater than 95% of a total mass of Pb(II) is removed from the aqueous solution, preferably greater than 96%, preferably greater than 97%, preferably greater than 98%, preferably greater than 99%, preferably greater than 99.7% of a total mass of Pb(II) is removed from the aqueous solution.

Adsorption is a key mechanism of removing heavy metals in the present disclosure, which requires contact between the adsorbent material (composite) and the target adsorbate (heavy metal ions). There is generally an increase in the removal efficiency with increasing agitation speed until a certain level. In certain embodiments, the method further comprises agitation of the aqueous solution before, during or after the contacting. The agitation may encompass shaking, stirring, rotating, vibrating, sonication and other means of increasing contact between the composite of the current disclosure and heavy metal ions. Further, the agitation can be performed manually or mechanically. In one embodiment, the treatment and contacting process may be enhanced by mechanical shaking or agitation, preferably by a bath shaker at a speed of up to 1000 rpm, preferably up to 750 rpm, preferably up to 500 rpm, preferably 50-450 rpm, preferably 75-375 rpm, preferably 100-300 rpm in order to increase contact between the composite and heavy metal ions.

In a preferred embodiment, the method further comprises recovering and reusing a heavy metal loaded composite after an around of adsorption process. In certain embodiments, the heavy metal loaded composite may be obtained from the aqueous solution with methods including, but not limited to, filtration, centrifugation, evaporation, heated evaporation and the like, preferably filtration or centrifugation, most preferably filtration. In certain embodiments, the obtained heavy metal loaded composite may be washed several times with an appropriate solvent to remove all materials present after each round of heavy metal absorption before being regenerated and reused and/or recycled in another round of removal of heavy metal ions from an aqueous solution.

The examples below are intended to further illustrate procedures for preparing and characterizing the composites of the present invention, and assessing the method for heavy metal removal using these composites. They are not intended to limit the scope of the claims.

EXAMPLE 1

Materials

Melamine, 1, 6-diaminohexane and paraformaldehyde were supplied by Fluka Chemie AG (Buchs, Switzerland) and subsequently used as received with further modification. N, N-dimethylformamide (DMF) was supplied by Sigma-Aldrich (Germany).

All other solvents and reagents employed were standard and of analytical grade.

EXAMPLE 2

Synthesis of Functionalized CNTs

Carbon nanotubes (CNTs) were prepared by the Chemical Vapor deposition method carried out in a horizontal tubular reactor containing a quartz tube of 3 cm in diameter and 130 cm in length. High purity Ferrocene was inserted inside the first part of the tube. Ar gas was introduced into the tube to flush and remove the air. After the catalyst was heated up to 120° C., the reducing agent ($H_2$ gas) and the carbon source (acetylene) were introduced. The temperature was controlled at 850° C. for 2 h. After that, the system was allowed to cool under a low-flow of Ar. Then the CNT were collected from the reaction zone in the middle of the quartz tube. The obtained CNTs were functionalized with oxygen containing groups by treatment with nitric acid. Briefly, CNTs (1g) were dispersed in concentrated nitric acid and refluxed for 6 h under vigorous stirring at 120° C. After cooling, the nanotubes were separated from the mixture by centrifuge, then, washed with distilled water and dried under vacuum at 60° C. until a constant weight was achieved.

EXAMPLE 3

Synthesis of Polymer/CNT Composites (MFDH)

One-pot in-situ polymerization reaction of melamine (1.9 mmol, 0.24 g), 1,6-diaminohexane (5.7 mmol, 0.344 g) and paraformaldehyde (11.4 mmol, 0.664 g) and a specific amount of chlorinated CNTs (0.00, 0.01, 0.02, 0.05 and 0.1 wt. %) prepared by refluxing activated carbon nanotubes (CNTs) (5% COOH) in excess thionyl chloride were sonicated in 6 mL of DMF in the nitrogen inert atmosphere for 30 minutes. The reaction mixture was stirred at 90° C. for 24 hours. The product was washed in DMF, distilled water and acetone, and dried at 60° C. under vacuum until a constant weight was achieved (Table 1).

TABLE 1

Polymerization results for the synthesis of CNT-Polymer composites

| Product code | % wt. CNT | Yield (%) | % C | % H | % N |
|---|---|---|---|---|---|
| MFDH | — | 64.1 | 68.08 | 11.78 | 16.63 |
| MFDH1 | 0.01 | 65.3 | 65.43 | 12.52 | 17.03 |
| MFDH2 | 0.02 | 69.4 | 67.62 | 13.10 | 17.28 |
| MFDH3 | 0.05 | 70.8 | 68.03 | 13.35 | 17.58 |
| MFDH4 | 0.1 | 72.4 | 67.81 | 13.59 | 17.10 |

Yield (%) = (product mass/reactants total mass) × 100%.
% wt. of CNT relative to reactants weight.

EXAMPLE 4

Chemical Analysis, Thermal Analysis and Morphology/Surface Characterization

Infrared spectra of the composites were analyzed on a Perkin Elmer 16F PC FT-IR spectrometer using KBr pellets within 4000-500 $cm^{-1}$ wavelength region. Solid-state $^{13}C$-NMR spectra were taken using a Bruker WB-400 spectrometer with a spinning rate of 10 KHz. Micrometrics TriStar III BET surface area analyzer was operated using the Brunauer-Emmett-Teller (BET) $N_2$ method. Elemental analysis was done using a Perkin-Elmer Elemental Analyzer series II Model 2400. Powder X-ray Diffraction pattern for crystal nature was recorded using a Rigaku Miniflex II Desktop X-ray Diffractometer with 3° and stop angle of 70°, sampling step size of 0.03, scan speed of 3.00, 30 KV and 15 mA. Inductively Coupled Plasma Mass Spectroscopy (ICP-MS) analyses of wastewater before and after the treatment with composites were done using an ICP-MS X Series-II (Thermo Scientific).

EXAMPLE 5

Characterizations of Polymer Composite (MFDH)

Figure 1:
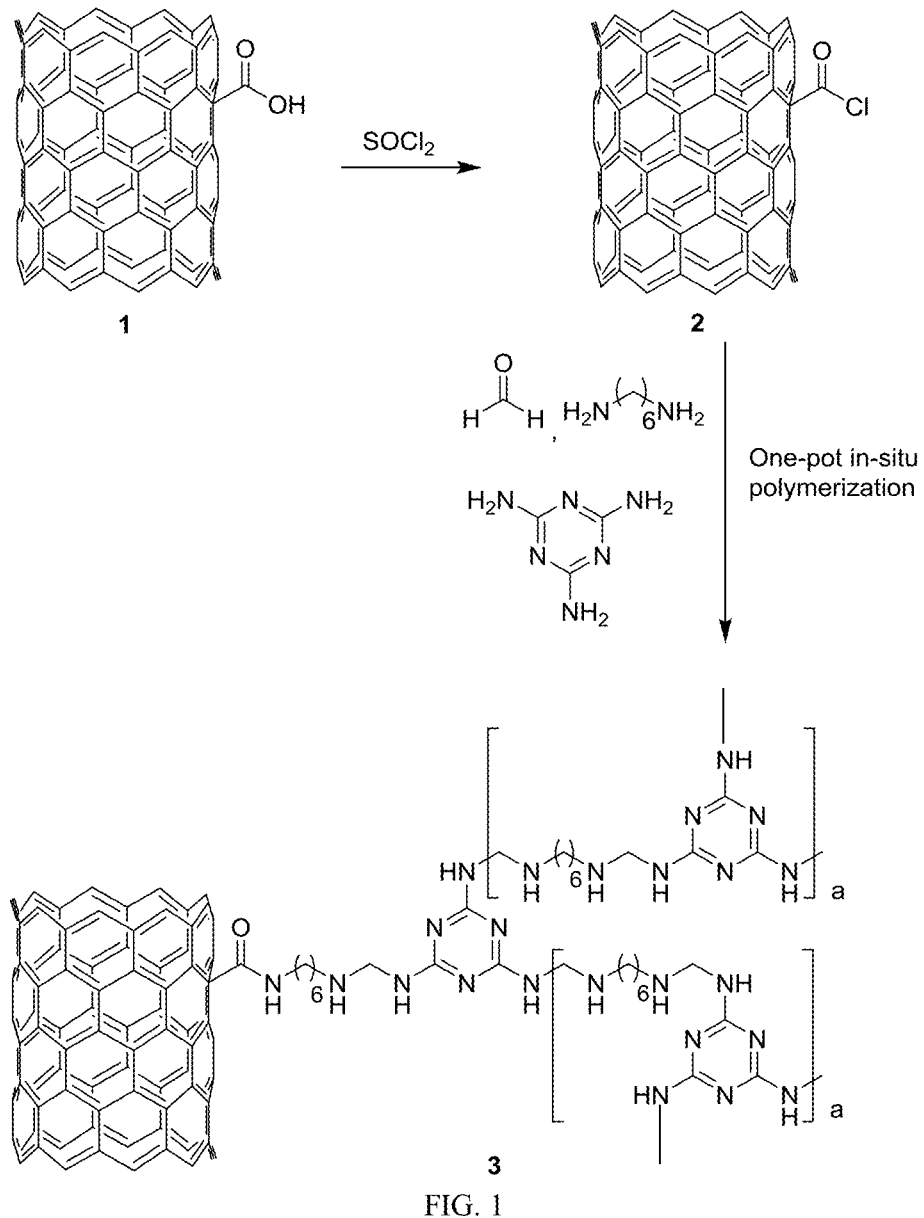
FIG. 1 is a synthetic process to form a composite (3) wherein each $R_1$, $R_2$, and $R_3$ are a hydrogen, and n is 6.

The polyamine—CNT composites (FIG. 1) were prepared by a one-pot polycondensation reaction. The synthesized material reveals a distinctive difference in color and a more homogeneous distribution of CNT as the percentage of CNT % increases as shown in FIG. 2.

The polymer composites were characterized using different spectroscopic methods, as the polymer and polymer composites are insoluble in solvents. The polymer/CNT was characterized by solid state $^{13}C$-NMR. The NMR spectra reveal the formation of the proposed polymer structure as shown in FIG. 3. The figure reveals a peak at ~165 ppm corresponding to the melamine imine (—C=N—) bond, a peak at ~73 ppm corresponding to —$CH_2$— bond between the melamine nitrogen and the alkyl diamine nitrogen, a peak at ~53 ppm corresponding to the —$CH_2$— bond directly connected to the amine of the alkyl diamine, and a peak at ~30 ppm corresponding to the aliphatic chain of the alkyl diamine. Also, as the amount of CNT increases to 0.1 wt % the CNT material masks the peaks as noise starts to build up in the spectra (Ebdon, J. R., Hunt, B. J., O'Rourke, W. T. S., Parkin, J., 1988. Characterisation of some melamine-formaldehyde condensates and some cured resins by $^{13}C$ and $^{15}N$ n.m.r. spectroscopy, British Polymer Journal 20, 327-334, incorporated herein by reference in its entirety).

FT-IR spectra shown in FIG. 4 reveal the presence of a broad band at ~3450 $cm^{-1}$ assigned to —NH— and —OH— groups, a band in MFDH at 3200 $cm^{-1}$ assigned to secondary amine, peaks at ~2960 $cm^{-1}$ assigned to —$CH_2$— symmetric and asymmetric stretching vibrations. Bands at ~1450 to ~1640 $cm^{-1}$ are assigned to —C=N— triazine ring in melamine and the amide —CO(NH—) linkage between CNT and polymeric structure (Zhang, H., Zhang, Z., Hu, Y., Yang, X., Yao, S., 2011. Synthesis of a Novel Composite Imprinted Material Based on Multiwalled Carbon Nanotubes as a Selective Melamine Absorbent, Journal of Agricultural and Food Chemistry 59, 1063-1071, incorporated herein by reference in its entirety).

Raman scattering experiments were utilized to detect the CNT bands in the polymer composite. The spectra shown in FIG. 5 reveal an increase in the G-band intensity at ~1600 $cm^{-1}$ as a higher weight percentage of CNT is incorporated with the polymeric material to form the polymer composite (Mobasherpour, I., Salahi, E., Ebrahimi, M., 2014. Thermodynamics and kinetics of adsorption of Cu(II) from aqueous solutions onto multi-walled carbon nanotubes, Journal of Saudi Chemical Society, 18, 792-801, incorporated herein by reference in its entirety).

XRD diffraction patterns shown in FIG. 6 reveal a decrease in the degree of crystallinity of the synthesized composites as the amount of CNT increased from 0% to 0.1%, which could be attributed to an increased disruption of the semi-crystalline order of the synthesized CNT/polymer composite.

BET surface area results in FIG. 7 and Table 2 show an increase in the surface area as the amount of CNTs increases. The BET $N_2$ adsorption-desorption isotherms reveal that the material has a type III isotherm, which indicates a multilayer adsorption or a heterogeneous adsorption on non-porous adsorbents as revealed by their low surface area obtained (Thommes, M., Kaneko, K., Neimark, A. V., Olivier, J. P., Rodriguez-Reinoso, F., Rouquerol, J., Sing, K. S. W., 2015. Physisorption of gases, with special reference to the evaluation of surface area and pore size distribution (IUPAC Technical Report), Pure Appl. Chem., 87, 1051-1069, incorporated herein by reference in its entirety).

TABLE 2

Surface area of synthesized polymer/CNT composites.

| Composite | Surface area (m²/g) |
|---|---|
| MFDH | 4 |
| MFDH-1 | 9 |
| MFDH-2 | 10 |
| MFDH-3 | 12 |
| MFDH-4 | 18 |

Thermogravimetric Analysis (TGA) thermograms shown in FIG. 8 reveal the thermal stability of the polymer/CNT composite as these composite begin to decompose at 200° C. An increase in weight percentage of CNTs does not lead to a distinctive increase in the thermal stability, which could be attributed to the small amount of CNTs added (0.0-0.1 wt %).

EXAMPLE 6

Adsorption Experiments

Lead solutions of different concentrations ranging from 1 to 40 ppm were prepared by continuous dilution of a 1000 ppm stock solution. The pH of lead (II) ion solutions was maintained by adding 0.1 M $HNO_3$. The adsorption experiments were performed in a batch mode. Briefly, a 20 mL portion of a sample solution containing lead ions at a specific pH was mixed with a certain amount of adsorbent dosage and the mixture was stirred at 100 rpm till equilibrium was reached. Then, the suspension was filtered. The residual concentration of lead in the supernatant liquid was measured by ICP. Various experimental variables such as polymer type, pH of the solution, contact time, concentration and temperature were measured for lead removal.

In order to understand the interaction effect between the adsorption determining parameters, the design of experiment (DOE) was performed with a 95% confidence limit. The one variable at a time method does not provide information about the interaction between the variables. The factors that were considered herein are CNT: polymer ratio (0.01, 0.05 and 0.1), pH (2, 4, and 6), lead initial concentration (1, 20.5 and 40 ppm) and temperature (298, 313 and 328 K). CNT: polymer ratio was selected based on the preliminary tests regarding the ranges of the ratio, which showed that a lower amount of CNTs provided better dispersion and thus interaction. The low and high ends of pH were selected as 2 and 6 respectively, because lead ions start to precipitate at pH>7. The low and high levels of the lead initial concentrations were selected to simulate real industrial wastewater samples.

Based on the experimental design, the adsorption tests were performed using the prepared polymer composite. For a typical sorption evaluation experiments, 0.03 g of the adsorbent was stirred in a 20 mL of Pb(II) at a predetermined concentration in mg $L^{-1}$ at a given pH up to equilibrium. The pH of the solution was controlled using 0.1 M $HNO_3$. The generated data are summarized in Table 3.

TABLE 3

Design matrix of the factorial design and their corresponding percentage removal (%)

| Factor | | | | Low level (−1) | High level (+1) |
|---|---|---|---|---|---|
| (A) | CNT:Polymer ratio | | | 0.01 | 0.1 |
| (B) | pH | | | 2 | 6 |
| (C) | Lead initial concentration (ppm) | | | 1 | 40 |
| (D) | Temperature (K) | | | 298 | 328 |

| Run | (A) | (B) | (C) | (D) | Percentage |
|---|---|---|---|---|---|
| 1 | 0.100 | 6 | 1.0 | 298 | 72 |
| 2 | 0.010 | 2 | 40.0 | 298 | 40 |
| 3 | 0.010 | 6 | 1.0 | 328 | 99 |
| 4 | 0.100 | 2 | 40.0 | 328 | 35 |
| 5 | 0.055 | 4 | 20.5 | 313 | 58 |
| 6 | 0.010 | 2 | 1.0 | 298 | 36 |
| 7 | 0.100 | 6 | 40.0 | 298 | 47 |
| 8 | 0.100 | 2 | 1.0 | 328 | 33 |
| 9 | 0.010 | 6 | 40.0 | 328 | 37 |
| 10 | 0.055 | 4 | 20.5 | 313 | 56 |
| 11 | 0.010 | 6 | 1.0 | 298 | 98 |
| 12 | 0.100 | 2 | 40.0 | 298 | 38 |
| 13 | 0.100 | 6 | 1.0 | 328 | 99 |
| 14 | 0.010 | 2 | 40.0 | 328 | 10 |
| 15 | 0.055 | 4 | 20.5 | 313 | 54 |
| 16 | 0.100 | 2 | 1.0 | 298 | 66 |
| 17 | 0.010 | 6 | 40.0 | 298 | 48 |
| 18 | 0.010 | 2 | 1.0 | 328 | 30 |
| 19 | 0.100 | 6 | 40.0 | 328 | 32 |
| 20 | 0.055 | 4 | 20.5 | 313 | 53 |

EXAMPLE 7

Results of the Factorial Design

Based on the experimental design, the adsorption tests were performed using the prepared polymer. The response removal was utilized to study the effect of the factors and their interactions. FIGS. 9A-C depict the normal plot, half normal plot and Pareto chart of the standardized effect. The factorial design findings indicate that the lead ions initial concentration and temperature had the highest effect on lead removal. Increasing the temperature increases the lead removal. The interaction between pH and CNT: polymer ratio has the highest interaction effect. FIG. 10A indicates that the composite with a CNT: polymer ratio of 0.1 has the highest lead ions adsorption efficiency among the three composites tested in these experiments. Decreasing the initial concentration and temperature and increasing the pH were found to increase lead removal efficiency, as shown in FIG. 10B. The highest interaction effect is between CNT: polymer, pH and initial concentration. Based on these results, composites with a CNT: polymer ratio of 0.1 were selected to be further tested. FIG. 10C depicts the output of a response surface plot showing the effect of dosage and time and their mutual effect, which was obtained by plotting values of contact time and dosage ratio. It can be noticed that the effect of the contact time is more pronounced at lower dosages than at higher dosages of the adsorbent.

EXAMPLE 8

Wastewater Treatments

In order to evaluate the real efficacy of the synthesized composites, a sample of industrial wastewater spiked with lead ions was treated with MFDH-4 which demonstrates the best adsorption removal results (Table 4). Treatment of a wastewater sample reveals that MFDH-4 is capable of removing ~99% of lead ions in this application. The treatment of the wastewater sample proves the potential usage of MFDH-4 as an industrial adsorbent for wastewater treatment.

TABLE 4

Spiked industrial wastewater sample treated with MFDH-4.

| Metal ion | Before treatment (µg/L) | After treatment (µg/L) |
|---|---|---|
| Pb (spiked) | 2869 ± 0.438 | 39.28 ± 0.438 |
| Cd | 0.71 ± 0.213 | 0.077 ± 0.213 |
| As | 102.5 ± 7.077 | 15.89 ± 7.077 |
| Zn | < MDL | < MDL |
| Cu | 32.18 ± 9.235 | 0.302 ± 9.235 |
| Ni | 40.88 ± 4.275 | 13.52 ± 4.275 |
| Co | 2.743 ± 0.405 | 0.878 ± 0.405 |
| Mn | 7.046 ± 1.215 | 7.707 ± 1.215 |
| Cr | 127.6 ± 3.594 | 22.26 ± 3.594 |

Mean and standard deviation of three replicates (n = 3).
± Values are the method detection limit (MDL),
3σ of the blank sample.

The invention claimed is:

1. A composite, which is a polycondensation product formed by a reaction of:
   melamine;
   an aldehyde of formula (I)

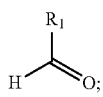
(I)

a diaminoalkane of formula (II)

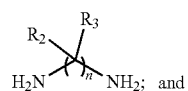
(II)

carbon nanotubes comprising activated carbonyl groups; wherein:
   $R_1$ is selected from the group consisting of an arylalkyl group which is optionally substituted, a cycloalkyl group which is optionally substituted, and an aryl group which is optionally substituted;
   $R_2$ is selected from the group consisting of a hydrogen, an alkyl group which is optionally substituted, a cycloalkyl group which is optionally substituted, an aryl group which is optionally substituted, and an arylalkyl group which is optionally substituted;
   $R_3$ is selected from the group consisting of a hydrogen, an alkyl group which is optionally substituted, a cycloalkyl group which is optionally substituted, an aryl group which is optionally substituted, and an arylalkyl group which is optionally substituted;
   n is a positive integer in the range of 12 to 20; and
   a weight percentage of the carbon nanotubes relative to a total weight of the composite is 0.005 wt % to 0.5 wt %.

2. The composite of claim 1, wherein a molar ratio of the diaminoalkane of formula (II) to melamine is in the range of 1:1 to 5:1, and a molar ratio of the aldehyde of formula (I) to melamine is in the range of 2:1 to 10:1.

3. The composite of claim 1, wherein the activated carbonyl group is an acyl halide group.

4. The composite of claim 1, wherein the carbon nanotubes are at least one selected from the group consisting of multi-walled carbon nanotubes and single-walled carbon nanotubes.

5. The composite of claim 1, which has a BET surface area in the range of 4-50 m²/g.

6. The composite according to claim 1, wherein $R_1$ is a cycloalkyl group which is optionally substituted.

7. The composite according to claim 6, wherein $R_1$ is selected from the group consisting of a cyclopropyl group, a cyclobutyl group, a cyclopentyl group, a cyclohexyl group, a norbornyl group and an adamantyl group.

8. The composite according to claim 1, wherein $R_1$ is an aryl group which is optionally substituted.

9. The composite according to claim 8, wherein $R_1$ is selected from the group consisting of a phenyl group, a biphenyl group, a naphthyl group, a thienyl group and an indolyl group.

10. The composite according to claim 1, wherein $R_1$ is an arylalkyl group.

11. The composite according to claim 10, wherein $R_1$ is selected from the group consisting of a benzyl group, a phenethyl group, a 2-methylbenzyl group, a 3-methylbenzyl group, a 4-methylbenzyl group, a 2,4-dimethylbenzyl group, a 2-(4-ethylphenyl)ethyl Group and a 3-(3-propylpherryl)propvl group.

12. A method for moving a heavy metal from an aqueous solution, comprising:
   contacting the aqueous solution having an initial concentration of the heavy metal with the composite of claim 1 to form a mixture; and
   filtering the mixture to obtain an aqueous solution having a reduced concentration of the heavy metal compared to the initial concentration.

13. The method of claim 12, wherein the heavy metal is an ion of at least one heavy metal selected from the group consisting of Pb, Cd, As, Zn, Cu, Ni, Co, Mn, and Cr.

14. The method of claim 12, wherein the heavy metal is Pb(II).

15. The rrrethod of claim 12, wherein the aqueous solution has a pH in the range of 1 to 7.

16. The rrrethod of claim 12, wherein the initial concentration of the heavy metal in the aqueous solution ranges from 0.1 mg L$^{-1}$ to 100 mg L$^{-1}$.

17. The method of claim 12, wherein the composite is present at a concentration in the range of 0.1-10 g per liter of the aqueous solution during the contacting.

18. The method of claim 12, wherein the composite is contacted with the aqueous solution for 0.1-12 hours.

19. The method of claim 12, wherein the composite is contacted with the aqueous solution at a temperature in the range of 15° C. to 80° C.

20. The method of claim 12, wherein greater than 25% of a total mass of the heavy metal is removed from the aqueous solution.

* * * * *